(12) United States Patent
Helfman

(10) Patent No.: US 8,806,321 B2
(45) Date of Patent: Aug. 12, 2014

(54) INTERACTIVE CONTROLS AND INFORMATION VISUALIZATION USING HISTOGRAM EQUALIZATION

(75) Inventor: Jonathan Helfman, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1901 days.

(21) Appl. No.: 11/768,686

(22) Filed: Jun. 26, 2007

(65) Prior Publication Data

US 2009/0002370 A1  Jan. 1, 2009

(51) Int. Cl.
*G06F 17/00* (2006.01)
*G06F 3/048* (2013.01)
*G06F 9/44* (2006.01)

(52) U.S. Cl.
CPC .. *G06F 3/048* (2013.01); *G06F 9/44* (2013.01)
USPC .......................................... 715/215; 715/212

(58) Field of Classification Search
CPC ................................... G06F 3/048; G06F 9/44
USPC .................................... 702/180; 715/212, 215
See application file for complete search history.

(56) References Cited

U.S. PATENT DOCUMENTS

| | | | |
|---|---|---|---|
| 3,979,555 A | 9/1976 | Opittek et al. | |
| 5,426,517 A | 6/1995 | Schwartz | |
| 5,857,033 A | 1/1999 | Kim | |
| 5,862,254 A | 1/1999 | Kim et al. | |
| 5,923,383 A | 7/1999 | Kim | |
| 5,963,665 A | 10/1999 | Kim et al. | |
| 5,995,656 A | 11/1999 | Kim | |
| 6,014,661 A * | 1/2000 | Ahlberg et al. | 1/1 |
| 6,018,588 A | 1/2000 | Kim | |
| 6,049,626 A | 4/2000 | Kim | |
| 6,163,621 A | 12/2000 | Paik et al. | |
| 6,259,472 B1 | 7/2001 | Park | |
| 6,334,095 B1 * | 12/2001 | Smith | 702/181 |
| 6,507,372 B1 | 1/2003 | Kim | |
| 6,583,794 B1 * | 6/2003 | Wattenberg | 715/708 |
| 6,650,774 B1 | 11/2003 | Szeliski | |
| 6,741,736 B1 | 5/2004 | Jaspers | |
| 6,850,642 B1 | 2/2005 | Wang | |
| 7,003,153 B1 | 2/2006 | Kerofsky | |
| 7,139,426 B2 | 11/2006 | Ivers et al. | |
| 2004/0021695 A1 * | 2/2004 | Sauermann et al. | 345/786 |
| 2006/0036639 A1 * | 2/2006 | Bauerle et al. | 707/102 |

OTHER PUBLICATIONS

Matthews, James, "Histogram Equalization", 2004, http://www.generation5.org/content/2004/histogramEqualization.asp, pp. 1-4, (retrieved Jun. 29, 2007).
"Histogram Equalization", 1994, http://www.cee.hw.ac.uk/hipr/html/histeq.html, pp. 1-6, (retrieved Jun. 29, 2007).

* cited by examiner

*Primary Examiner* — William Bashore
*Assistant Examiner* — Gregory A Distefano
(74) *Attorney, Agent, or Firm* — Omkar K. Suryadevara; Silicon Valley Patent Group LLP

(57) ABSTRACT

A user interface uses histogram equalization to allow easier manipulation and visualization of a data set, especially data sets having values that are not distributed uniformly. The user interface can show values of a data set in different colors or shades of colors, or a combination of these, or in grayscale. Additionally, values can also be represented according to a size or area relative to other values. A user may change views of the data by adjusting controls of the interface including slider bars, dials, tool bars, button bars, and others, and combinations of these.

36 Claims, 6 Drawing Sheets

US 8,806,321 B2

INTERACTIVE CONTROLS AND INFORMATION VISUALIZATION USING HISTOGRAM EQUALIZATION

BACKGROUND OF THE INVENTION

This invention relates to the field of computer user interfaces and more specifically, to a user interface providing information visualization with an interactive control to allow a user to alter the visualization as desired.

In this age of information, vast amounts of data are continuously being gathered in many different industries. There are a seemingly endless number of data sources including mobile phone calls, airplane take-offs and landings, computer help desk calls, downloading of movies or music, and many others. It is desirable to analyze the data so that relationships may be determines, so that resources may be more effectively allocated and customers and users can be better served.

Trying to determine a relationship for a given data set or data is generally a difficult task, especially when the data is distributed in a nonuniform or nonlinear way. Many existing interactive systems for helping people understand or manipulate data employ linear interpolation techniques which make the implicit assumption that the data are uniformly distributed within their range from the minimum data value to the maximum data value. However, one should not assume real-world data sets to be distributed uniformly across their range. In fact, it is rare for data that is sampled from real-world problems and applications to be uniformly distributed.

Linear interpolation techniques are well known to be susceptible to a variety of quantization errors for data sets that are not distributed uniformly. Two specific examples of a problem occur in interactive controls for specifying a single data value and in graphs, charts, and other visualization techniques in which data values are displayed using a range of colors of gray values.

As a first specific example, a typical task when understanding or manipulating data is to specifying a single data value from within the range of values in a data set, such as when setting a threshold value for a filter. User interfaces that allow people to specify a single data value typically employ interactive controls such as slider bars or dials. Such interactive controls typically use a standard linear mapping between values of the slider's marker position and data values within the data range.

Linear mappings are most effective when the data are distributed uniformly, because then equal movements of the slider bar specify equal-sized portions of the data range. Linear mappings are less effective when the data set is distributed nonuniformly. In the worst case, the slider bar may be particularly ineffective when most of the data is concentrated at one end of the range, because adjusting it a single pixel at that end may skip most of the data values, while adjusting it several pixels at the other end may select only a few data values.

For specific types of distributions, there may be a mapping that approximates a solution, such as a log mapping for data values that are distributed exponentially. It would be better, however, to have a "nonparametric" slider bar that can analyze the data and automatically calculate an optimum mapping that would work for any distribution (e.g., log, exponential, bimodal, uniform, normal, and so forth).

As a second specific example, a similar problem occurs for data visualizations that attempt to map a range of colors to a range of data values: it is difficult to use colors effectively unless the data values are distributed uniformly within their range. As with the interactive control problem, it would be better to have a data visualization component that can analyze the data and automatically calculate an optimum mapping that would work for any data distribution while still retaining the general shape of the original distribution.

Therefore, it is desirable to provide interactive applications that allow people to understand and manipulate real-world data sets from a wide variety of contexts. An improved data visualization technique with a user interface having interactive controls for altering the visualization as the user desires is needed. The technique will apply nonparametric techniques such as histogram equalization, so that no assumptions are made about the actual data distribution.

BRIEF SUMMARY OF THE INVENTION

A user interface uses histogram equalization to allow easier manipulation and visualization of a data set, especially data sets having values that are not distributed uniformly. The user interface can show values of a data set in different colors or shades of colors, or a combination of these, or in grayscale. Additionally, values can also be represented according to a size or area relative to other values. A user may change views of the data by adjusting controls of the interface including slider bars, dials, tool bars, button bars, and others, and combinations of these.

Through histogram equalization, the invention takes information, especially nonuniform data distributions, and shifts this information toward equalization without altering significantly or "violating" the distribution's shape or structure. In particular, the shape of the distribution is maintained, but the values are spread out, especially at a particular point or points of interest in the distribution. In an implementation, in a graphical user interface, the user has access to interactive controls that vary or move the one or more point of interests where the data distribution is spread out. The data distribution may be shown in grayscale or color to further spread out the data visually. For example, by adjusting a slider bar, the user may shift the point of interest (shown in a graphical window) where the data is spread out.

In an embodiment, the invention is a method including: creating a first histogram of the data values of the data set, where the first histogram includes keys and first histogram values for the keys; creating a second histogram of the data values including generating second histogram values for each key of the first histogram, where the second histogram values include cumulative frequency values for each of the first histogram values; creating a mapping for data set based on the second histogram values; and generating a visualization for the data set including selecting an X position and a Y position for a data value of the data set based on the mapping.

Further, the method may include mapping a range of an interactive control based on the second histogram values and allowing changes to the visualization based on an adjustment to the interactive control made by a user.

In an embodiment, the invention is a method including: creating a first histogram of the data values of the data set, where the first histogram includes keys and first histogram values for the keys; creating a second histogram of the data values including generating second histogram values for each key of the first histogram, where the second histogram values include cumulative frequency values for each of the first histogram values; creating a color mapping for data set based on the second histogram values; and generating a visualization for the data set including selecting a color for a data value of the data set based on the color mapping.

The color mapping may be a gray value mapping. The generating a visualization may further include selecting an attribute for an object representing a data value shown in the visualization based on the data value's second histogram value. The attribute for an object may include at least one of an area of the object, a size of the object, a length of the object, a width of the object, a height of the object, a position of the object, an X position of the object, a Y position of the object, an angle of the object, or a distance of the object.

The generating a visualization may further include generating a large rectangle divided into a plurality of small rectangles, one small rectangle for each key of the first histogram and an area of each small rectangle is proportional to a first relative value for that smaller rectangle divided by a sum or other result of an aggregation function of the first relative values for the first histogram. The result of an aggregation function may be referred to as an aggregation value. Some examples of an aggregation functions or values include sum, average, maximum, minimum, median, or count.

The method may further include showing an informational window for a selected smaller rectangle when moving a cursor over the selected smaller rectangle. The large rectangle may be a square.

The method may further includes mapping a range of an interactive control based on the second histogram values and allowing changes to the visualization based on an adjustment to the interactive control made by a user. The interactive control may include a slider bar or dial.

In an embodiment, the invention is a method including: creating a first histogram of the data values of the data set, where the first histogram includes keys and first histogram values for the keys; creating a second histogram of the data values including generating second histogram values for each key of the first histogram, where the second histogram values include cumulative frequency values for each of the first histogram values; creating a mapping for data set based on the second histogram values; and providing a user interface for a visualization for the data set including an interactive control to alter the visualization based on the mapping.

The interactive control may include at least one of a slider bar, a joystick, a dial, a control mechanism to indicate a position along a path, a control mechanism to indicate a position within a two-dimensional range, a control to indicate a position within a range, a control to that indicates a pressure within a range of pressures, or a control that indicates a velocity within a range of velocities. The interface control may be implemented in software and displayed in the user interface The interface control may be accessible by a user through a pointer input device such as a mouse, joystick, trackball, game pad controller, or pen.

The method may further include allowing adjustment through the interactive control to specify at least one of a minimum key value or a maximum key value for data values shown in the visualization. In an implementation, the visualization does not show data values of zero.

In an embodiment, the invention is a user interface including: a visualization window to graphically display a data set, where an attribute of an object representing a data value of the data set is based on a normalized accumulated histogram for the data set; and an interactive control to adjust a view in the visualization window, where adjustments made through the slider bar are based on the a normalized accumulated histogram of the data set.

The attribute for an object may include at least one of an area of the object, a size of the object, a length of the object, a width of the object, a height of the object, a position of the object, an X position of the object, a Y position of the object, an angle of the object, or a distance of the object. The graphical display of the data set may include a large polygon divided into a plurality of small polygons, where the attribute of an object representing a data value is color.

The interactive control may include at least one of a slider bar, a joystick, a dial, a control mechanism to indicate a position along a path, a control mechanism to indicate a position within a two-dimensional range, a control to indicate a position within a range, a control to that indicates a pressure within a range of pressures, or a control that indicates a velocity within a range of velocities.

The interactive control may adjust at least one of a maximum area for a small polygon shown in the visualization window, a minimum area for a small polygon shown in the visualization window, a minimum color value for a small polygon shown in the visualization window, or a maximum color value for a small polygon shown in the visualization window.

In an embodiment, the invention is method including: creating a first histogram of the data values of the data set, where the first histogram includes keys and first histogram values for the keys; creating a second histogram of the data values including generating second histogram values for each key of the first histogram, where the second histogram values include cumulative frequency values for each of the first histogram values; creating a mapping for the data set based on the second histogram values; and providing a user interface for the data set include an interactive control to alter a physical characteristic based on the mapping.

Generally, in an implementation, the invention provides an interactive control that controls or varies a characteristic or output based on histogram equalization. The characteristic that is being altered may be any characteristic associated with a quantitative value. In this patent, visualization is used as merely an example of a characteristic that can be altered. The characteristic to be altered may be another characteristic other than a visualization.

Some examples of characteristics include sound, sound frequency, sound volume, light, light intensity, color, position, pressure, volume, fluid volume, temperature, electromagnetic radiation, current, voltage, resistance, impedance, inductance, capacitance, frequency, bandwidth, brightness, strength, or height, and any combination of these.

As further examples, the interactive control and characteristic to vary may be a joystick control to lower and raise a forklift, a knob to increase volume on an amplifier, a knob to change an oven temperature, one or more controls to move a robot, one or more controls for a robotic arm used in surgery, a control for a laser, and many others. There are a multitude of applications of interactive controls which the teachings to which the present invention may be applied.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
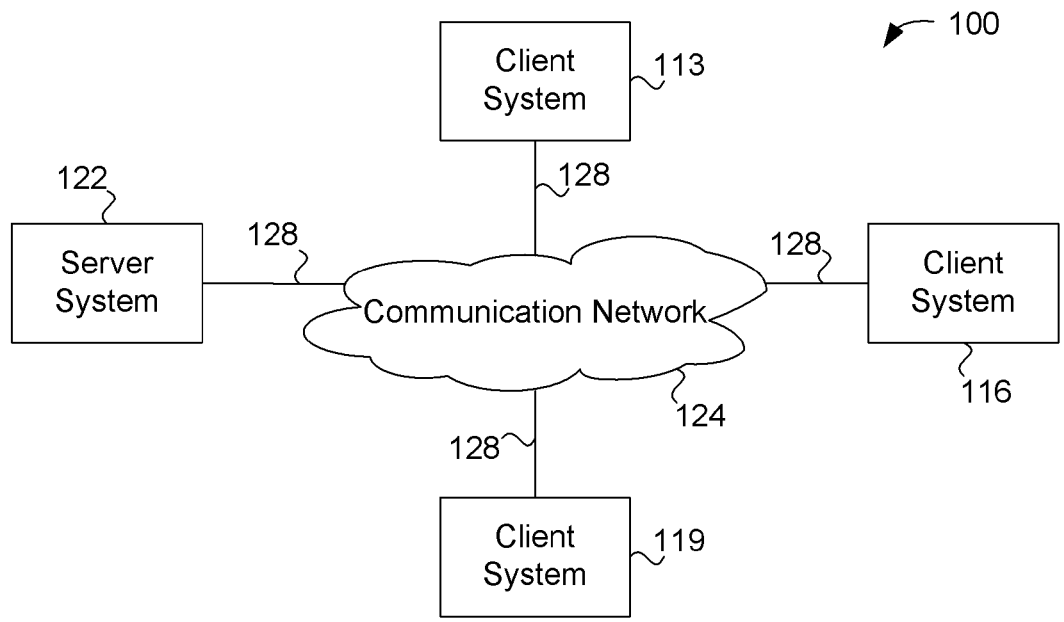
FIG. 1 shows a block diagram of a client-server system and network in which an embodiment of the invention may be implemented.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program provided by Microsoft Corporation, and the Firefox browser provided by Mozilla, and others.

Figure 2:
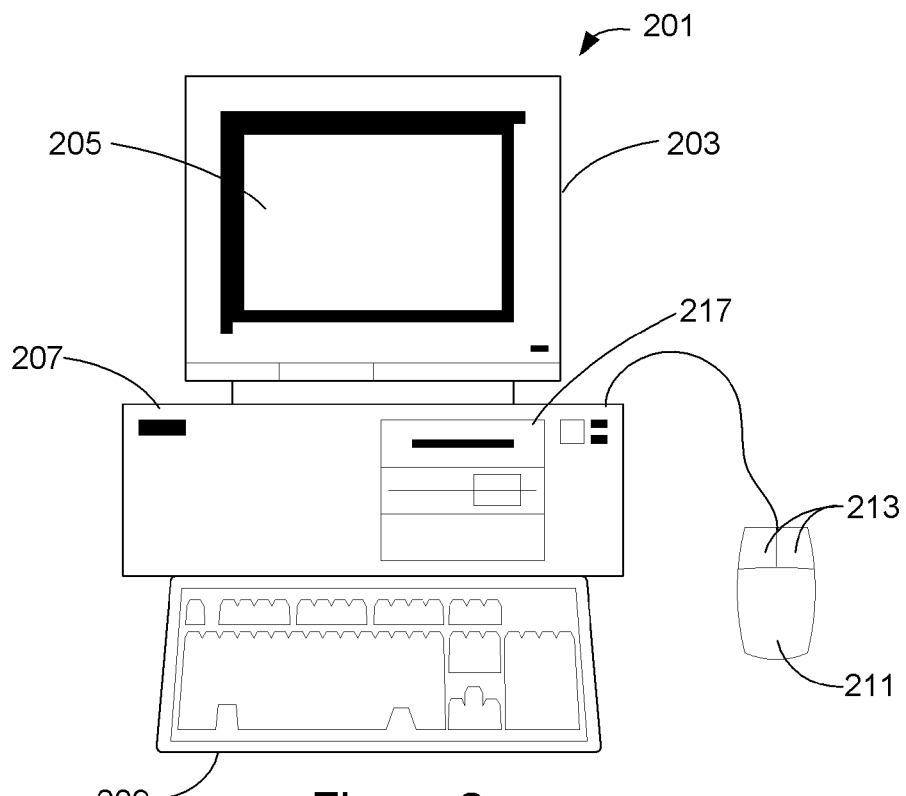
FIG. 2 shows a more detailed diagram of an exemplary client or computer which may be used in an implementation of the invention.

FIG. 2 shows an exemplary client system of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these. A computer-implemented or computer-executable version of the invention may be embodied using, stored on, or associated with non-transitory computer-readable medium. A non-transitory computer-readable medium may include any non-transitory medium that participates in providing instructions to one or more processors for execution. Such a non-transitory medium may take many forms including, but not limited to, nonvolatile, and volatile media. Nonvolatile media includes, for example, flash memory, or optical or magnetic disks. Volatile media includes static or dynamic memory, such as cache memory or RAM.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
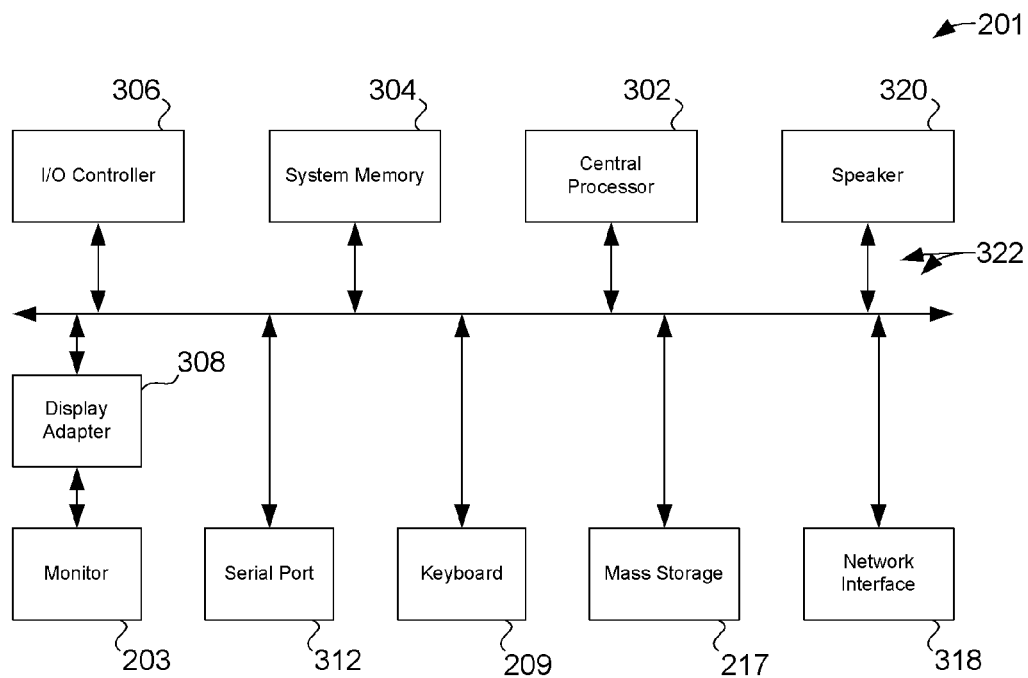
FIG. 3 shows a system block diagram of a client computer system used to provide a user interface according to the invention.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

Figure 4:
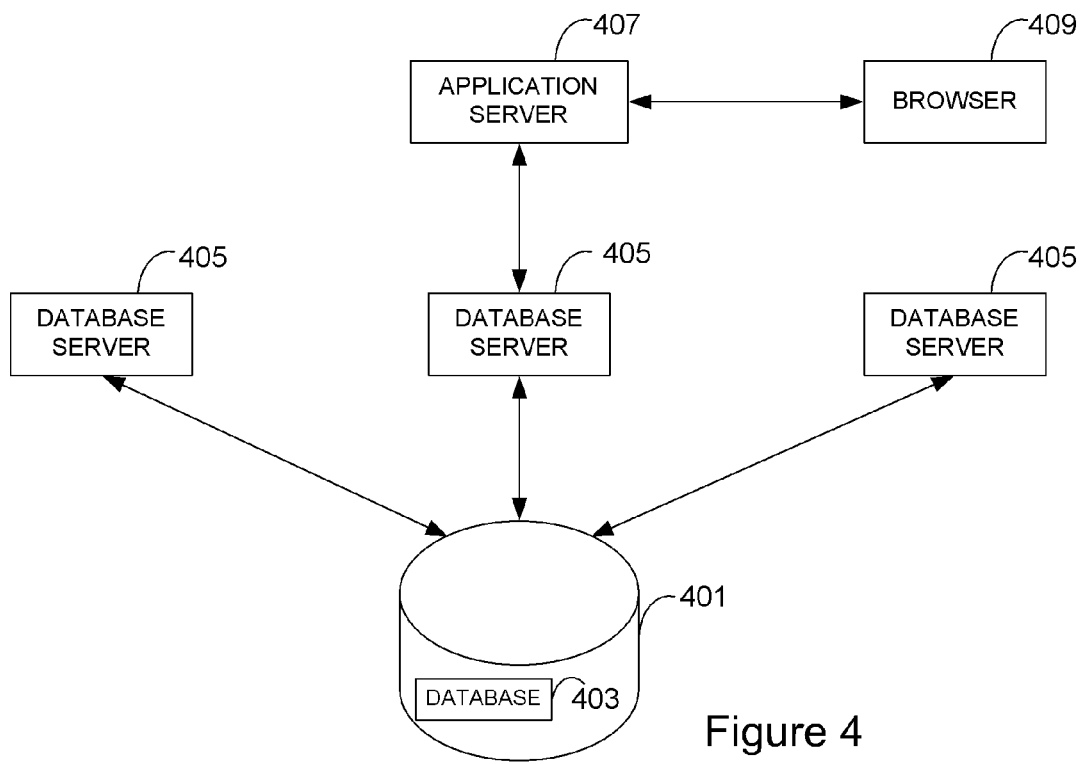
FIG. 4 shows data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
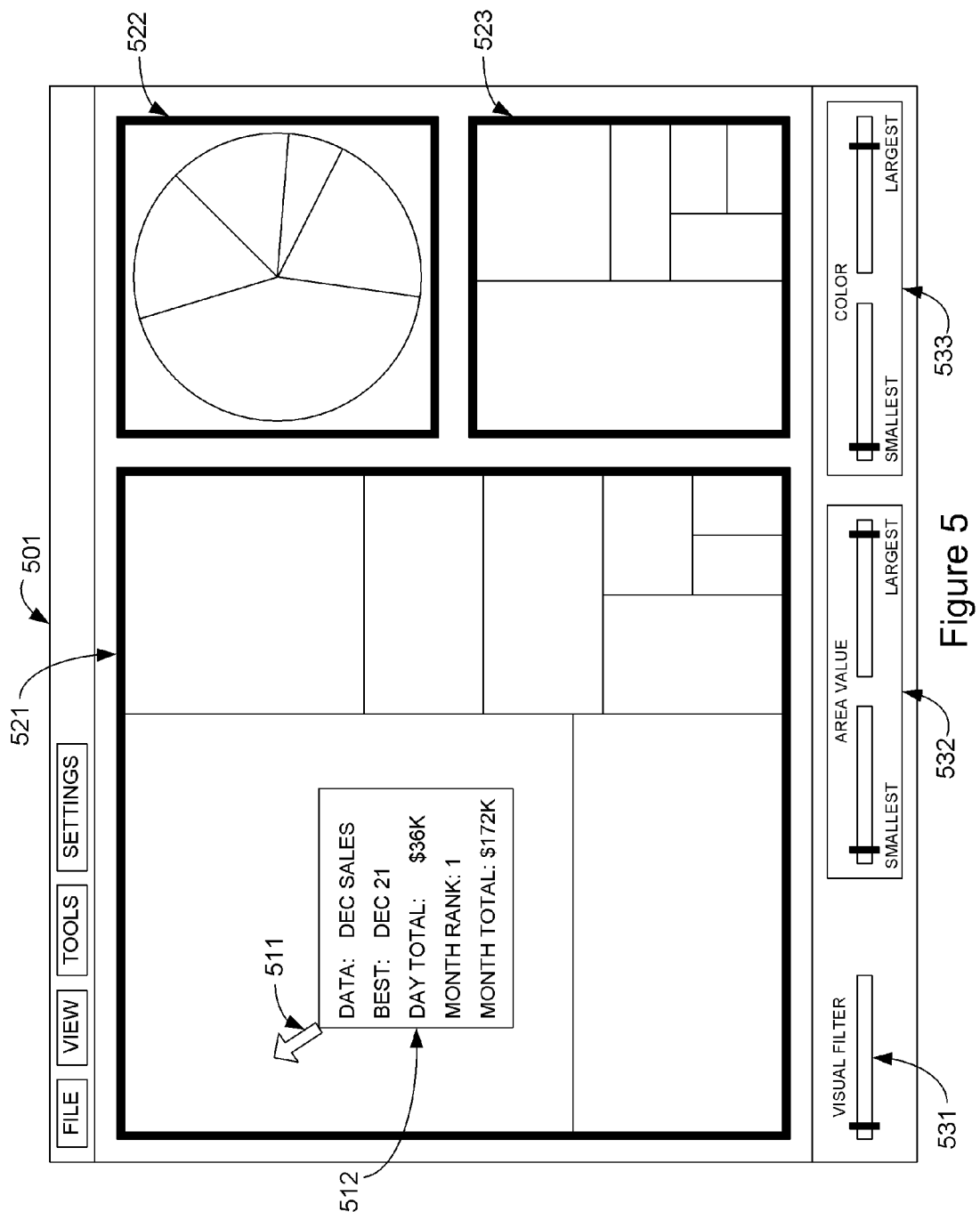
FIG. 5 shows a specific implementation of a graphical user interface of the invention.

An example of a user-friendly interface is a graphical user interface, allowing a user to access, view, analyze, and manipulate the data stored in a database. FIG. 5 shows an example of a graphical user interface with windows, tool bars, and slider bars. More detail for this interface is provided below. A user interface may be implemented as a standalone or dedicated program that executes on a computer or other electronic device. Or in the alternative or in addition, a user interface may be provided by way of a Web browser. For example, an interactive user interface of the invention may be accessed using a Web browser and running code such as in the JavaScript language. There are a multitude of ways a user interface may be implemented and provided to a user.

Data sources are generally designed to serve specific applications or clients. For example, an LDAP directory is designed to serve directory applications and a relational database is designed to serve applications that require database access instead of directory access.

FIG. 5 shows a specific implementation of a graphical user interface of the invention. This graphical user interface shows, typically on a computer monitor or display, one or more data sets using histogram equalization. In an implementation, the data sets are processed using a histogram equalization technique before displaying the data. By applying histogram equalization to the data and viewing with the graphical user interface, a user can see relationships in the data and data sets which may otherwise not be visible or discernable without using a technique of the invention.

Generally, histogram equalization has a desired effect of shifting a nonuniform data distribution more toward a uniform distribution. Histogram equalization allows an increase in the local contrast of data without affecting the global contrast. The approach uses a normalized cumulative probability distribution of the data values to spread out the most frequent values over a greater range of intensities when displayed on the screen. For grayscale images that are mostly gray, histogram equalization has the effect of making the darkest grays blacker and the lightest grays whiter. If the pixel values in the mostly gray image are considered to be data values that are distributed nonuniformly, histogram equalization has the effect of transforming the data distributions such that the most frequent values are distributed more uniformly than the least frequent data values.

For example, after applying histogram equalization, a user may be able to visually see through, for example, changing of the colors of the represented data or changes in the relative sizes of boxes of the represented data, or both, a relationship between two or more sets of data that were not previously discernable. This is similar to the situation where a set of data has a linear, geometric, logarithmic, or other relationship, but until shown graphically in the proper way, a user will not likely be able to realize the relationship. Once the relationship is recognized, the data can be modeled or handled appropriately. For example, if a relationship is linear, the relationship can be modeled using a linear equation or function such as $y=m*x+b$.

In an implementation, one or more data sets are run through a histogram equalization procedure. An example of a histogram equalization procedure is described below. Then, the data, which has been processed by histogram equalization, is viewable with a graphical user interface such as in FIG. 5. With the user interface, a user can also alter or change the view (e.g., by adjusting slider bars, knobs, dials, specifying a maximum or minimum limit, or both, or other input control for filters) of the data. Using this user interface, the user will be able to, as desired, (i) manipulate the data to obtain a desired graphical view of data, (ii) analyze the data based on one or more graphical views, and (iii) visualize the data.

Specifically, a screen 501 shows some data is represented in a larger rectangular box 521, some data is represented in a smaller rectangular box 523, and some data is represented in a pie chart 522. Boxes 521 and 523 and pie chart 522 may each represent a different data set. At the option of the user, the data may be displayed in grayscale or color. By showing the data graphically in color (e.g., 16-bit or 32-bit color), the user will be able to see the variations of the data: as an example, smaller gradations or variations may be seen as changes in color shading while greater variations may be seen as color changes. Grayscale may be useful in preparing screens for printing using a black-and-white printer such as a laser printer.

For ease of analyzing and manipulating the data, interactive user interfaces are provided consisting of slider bars. Other suitable interactive user interfaces may be also deployed. One slider bar 531 is provided to select a filter value setting a threshold for the data. A pair of slider bars for area analysis 532 is provided to analyze the data by selecting manipulating the smallest and largest values representing display area. Similarly, a pair of slider bars for color analysis 533 is provided.

In response to the user's input through the slider bars and keyboard, the rectangular boxes 521 and 523 and pie chart 522 change interactively. The boxes and pie chart may change in size and the slices within them may change in size, shape, configuration, and color. A window 512 pops up with information when a mouse pointer 511 is moved over or clicked on a slide in a display. The information shown in the pop-up window 512 is updated interactively in response to the user's input through the slide bars or keyboard.

This figure shows merely one example of a graphical interface which may be used with a histogram equalization approach of the invention. The principles of the invention may be applied to other user interfaces.

Figure 6:
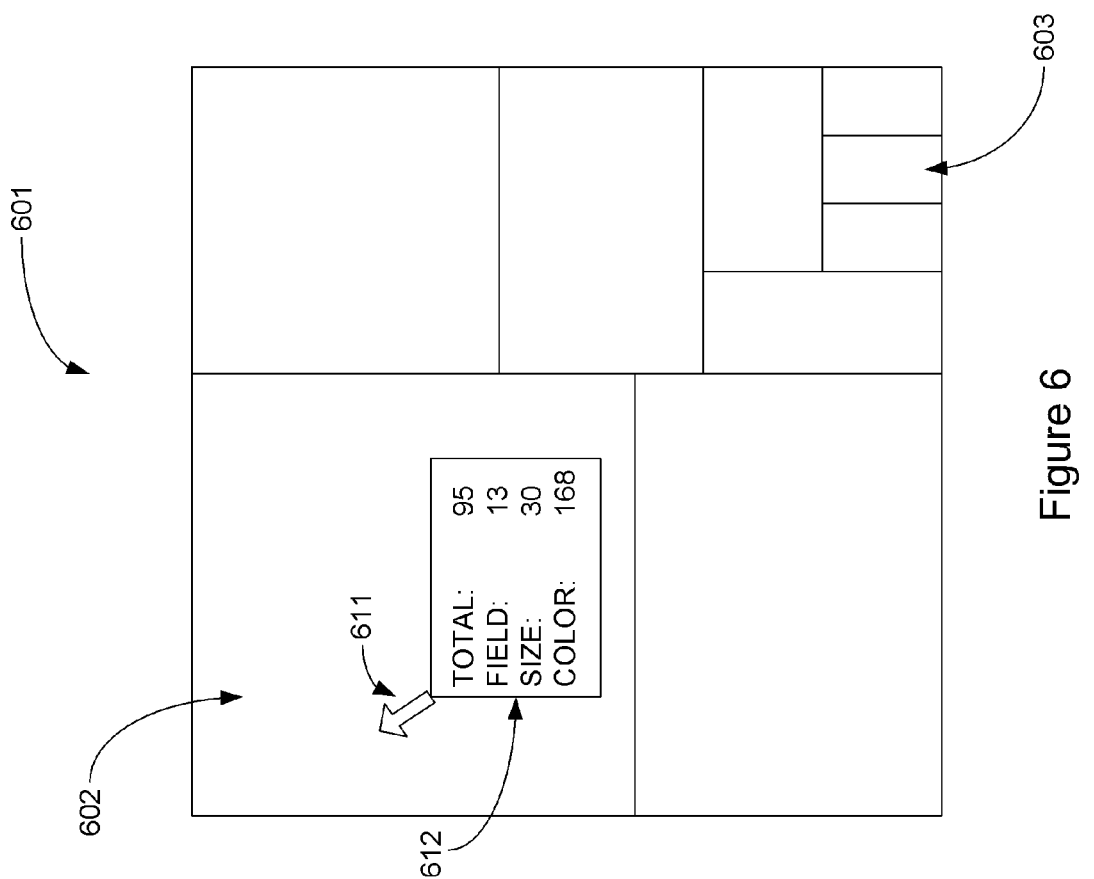
FIG. 6 shows another graphical user interface example of the invention.

FIG. 6 shows another graphical user interface example of the invention. This interface may be a complete user interface or a portion of a larger user interface. In this graphical user interface, data is visualized using rectangular boxes in rectangular display 601. In an implementation, the rectangular display is a square display, where the sides have equal length. In further implementations of the invention, other polygons or trapezoids may be used. Also, curved shapes and nonpolygons may be used (e.g., analogous to weather or thermal plots), including pie slices and three-dimensional shapes or three-dimensional perspectives.

The interior boxes of the rectangular display are proportional to the normalize cumulative frequencies of the data values as described later.

An appropriate technique is used to divide and shape the interior boxes. For example, the sizes of the boxes may be sized or ranked according area, length, width, height, or other dimension or characteristic of a box in the particular user interface.

FIG. 6 is shown with the data values of a sample data set (see below for discussion on sample data set 702). In this data set (702), data value 13 has the highest frequency of 30. This is represented by the largest interior box (602) inside the rectangular display. The data value 6, with a frequency of 4, is represented by a smaller interior box 603 in a lower, right corner of the rectangular display.

Optionally, the rectangular display may include other features. For example, an informational window 612 pops up when a pointing arrow 611 of the user interface system is moved over an interior box. For example, the user may move a mouse pointer so that it hovers somewhere over box 611. Then the informational window points up.

The interior boxes of the rectangular display are displayed in grayscale (e.g., varying shades of gray) and is discussed further below. In another embodiment, the interior boxes of the rectangular display are displayed in color and is discussed further below.

In the invention, a data set or a data set is prepared by applying histogram equalization. In an implementation, a technique of applying histogram equalization includes the following steps:

1. Provide a data set for analysis according to a technique of the invention.
2. Generate or create a histogram of the data set.
3. Compute a normalized accumulated histogram of the data set.
4. If an output range of a user interface is not given, determine the output range.
5. Map the normalized accumulated histogram to one having the range of the user interface.
6. Present the data set in the user interface using the mapped normalized accumulated histogram.
7. Interactively accepting input from a user.
8. Recalculate and showing the data set according to the input from the user.

A specific implementation of a flow for histogram equalization is presented in this patent, but it should be understood that the invention is not limited to the specific flow and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In a specific implementation of the invention, a histogram equalization technique for any data set is implemented as a reusable Java class. Other programming may also be used. This Java class improves the usability of data visualizations that map data ranges to color ranges. This class also improves the usability of interactive slider bars that are used to choose particular data values as filter thresholds.

The Java class stores the data set in a way that has several desirable benefits, making this particular implementation elegant and efficient in both memory and CPU time. The class functions as an ordered hash table, making it easy to identify duplicate data values and calculate their frequencies as the data is loaded. The class also uses a "red-black tree" data structure to store the hash table, which keeps the data values in ascending order.

A single pass through the data set is used to load the data set into the hash table and, simultaneously, create a histogram of the data. Once the data is loaded, the unique data values are stored as "keys" in the hash table, while their frequencies are stored as the "values" associated with each key. Values that occur only once in the data set will have a frequency of 1, values that occur twice will have a frequency of 2, and so forth.

A single pass through the keys of the histogram (the unique data values) is used to convert the histogram to a "normalized cumulative histogram" and to equalize it to a data range that may be different than the original data range. In the second pass, the keys of the hash table are iterated through and each associated frequency is replaced with a cumulative frequency (the sum of all previous frequencies) that is normalized by a specified range.

In this patent, the sum function is provided merely as an example of an aggregation function or aggregation value. The result of an aggregation function may be referred to as an aggregation value. Some examples of an aggregation functions or values include sum, average, maximum, minimum, median, and count. There are other functions that may be used. The aggregation function may be a mathematical function or relationship.

The range is specified by two parameters, min (or minimum) and max (or maximum), so that the technique may be used for different purposes. For example, when mapping the data set to a range of colors in a color map, the data's histogram should be normalized to the length of the color map. In this way the hash table is essentially configured to function as a look-up table, efficiently mapping data values to indexes in the color map. Whenever a graph, chart, or other visualization that displays data values as colors is to be rendered, the colors may be determined by using the data value as the key to directly obtain the color map index.

An equalized histogram may also be used to improve the usability of a slider bar for specifying a single data value in a data set that may be distributed nonuniformly. When mapping the data set to a slider bar, the data's histogram should be normalized to the length of the slider bar. In this case, a reverse transformation is needed to map pixel values from the slider control to data values.

The reverse transformation may take the form of a simple array with indexes that correspond to slider bar pixel positions, and values that correspond to unique values in the original data set (now stored as keys in the hash table). Such a reverse transformation is relatively easy to derive from the cumulative hash table because, since the hash table values have been generated by summing (or other function) previous values, the hash table values can have no duplicates. It is possible, therefore, to iterate once again through the hash table's keys, this time also iterating through the reverse transformation array, copying each key value into the array cells with indexes less than the key's associated value.

A reverse transformation array constructed this way can be used directly by a slider bar interactive control to map pixel values to data values. Note that even when the actual pixel length of a slider bar may not be determined, most slider bar interactive controls have an "effective range" that is used internally by the control to map pixel values to values within the effective range.

In this case, when mapping the data set to a slider bar, the data's histogram should be normalized to the length of the slider bar's effective range. For example, a slider bar control can include functionality like the standard Java Swing slider bar, a "JSlider," and also permit users to specify an integer value within an effective range of 0-100. A slider bar for specifying a value within a non-uniformly distributed data set that first transforms the data distribution as described above, is not only more useful, because it is possible to specify more data values in the data set, but it also more efficient, because each time a user adjusts it, it needs only perform a single array reference to determine a data value, instead of a linear mapping calculation involving at least subtraction, multiplication, and division.

Using histogram equalization for mapping data values to colors or portions of an interactive control is superior to using a linear mapping for data sets that are not uniformly distributed. In fact, it may also be computationally more efficient than using a "naïve" linear mapping equation when data is distributed uniformly because, as described above, the mappings are precomputed and cached in either hash tables or arrays that serve as look-up tables, which are known to be more efficient than repeated calculations.

Using histogram equalization is also superior to an approach that might attempt to characterize a data distribution and apply an appropriate mapping (such as identifying an exponential distribution and applying a log mapping in an attempt to equalize it), because the histogram equalization technique has appropriate behavior no matter how skewed or clumpy the data may be distributed.

Another technique, called quantiles, can be applied to map data values to colors that also uses a type of cumulative probability distribution. Quantiles are a form of binning or aggregating a data set of N data values into Q bins (also known as quantiles) by sorting the data values into an array and creating a new array of Q elements by uniformly sampling the first array at Q equally-spaced indexes. Sampling indexes are typically N/Q indexes apart. When Q is equal to the number of colors in a color map. A data value, d, may be mapped to color indexes by searching through the quantile array to find a pair of adjacent indexes, i and i+1, such that $Q[i] \leq d$ and $Q[i+1] > d$.

Quantile techniques can be improved in a number of ways: duplicate data values may be eliminated prior to sorting; a partial sort with bin widths that align with the quantile bin widths may be used instead of complete sorting; binary search may be used when searching the quantile array; and mappings of data values to colors may be precomputed and cached as an histogram equalization approach of the invention.

Some potential disadvantages of the quantile approach as compared to histogram equalization include duplicate representation and the possibility of sampling artifacts. When duplicate data values are not eliminated prior to sorting, there is a risk that data elements with a frequency greater than the quantile width will span multiple quantiles, causing multiple colors in the color map to map to the same data value. Alternatively, when duplicate data values are eliminated, the quantile technique does not treat the most frequent and likely data values any differently than the least frequent and least likely data values.

In contrast, the histogram equalization technique has the implicit effect of transforming data distributions such that the most frequent values are distributed more uniformly than the least frequent data values. Another potential disadvantage of the quantile approach is that because it uses uniform sampling to select values for the quantile array, it may be susceptible to quantization errors that are known to be associated with uniform sampling, such as aliasing artifacts.

For example, when quantiles are used to map a data set to colors in a data visualization, a periodic pattern in the data distribution with a period that is close to but not equal to the quantile width, may produce an illusory periodic color effect in the visualization. Such aliasing artifacts should not be a problem when periodic data distributions are mapped to colors using histogram equalization because uniform sampling is not used.

Figure 7:
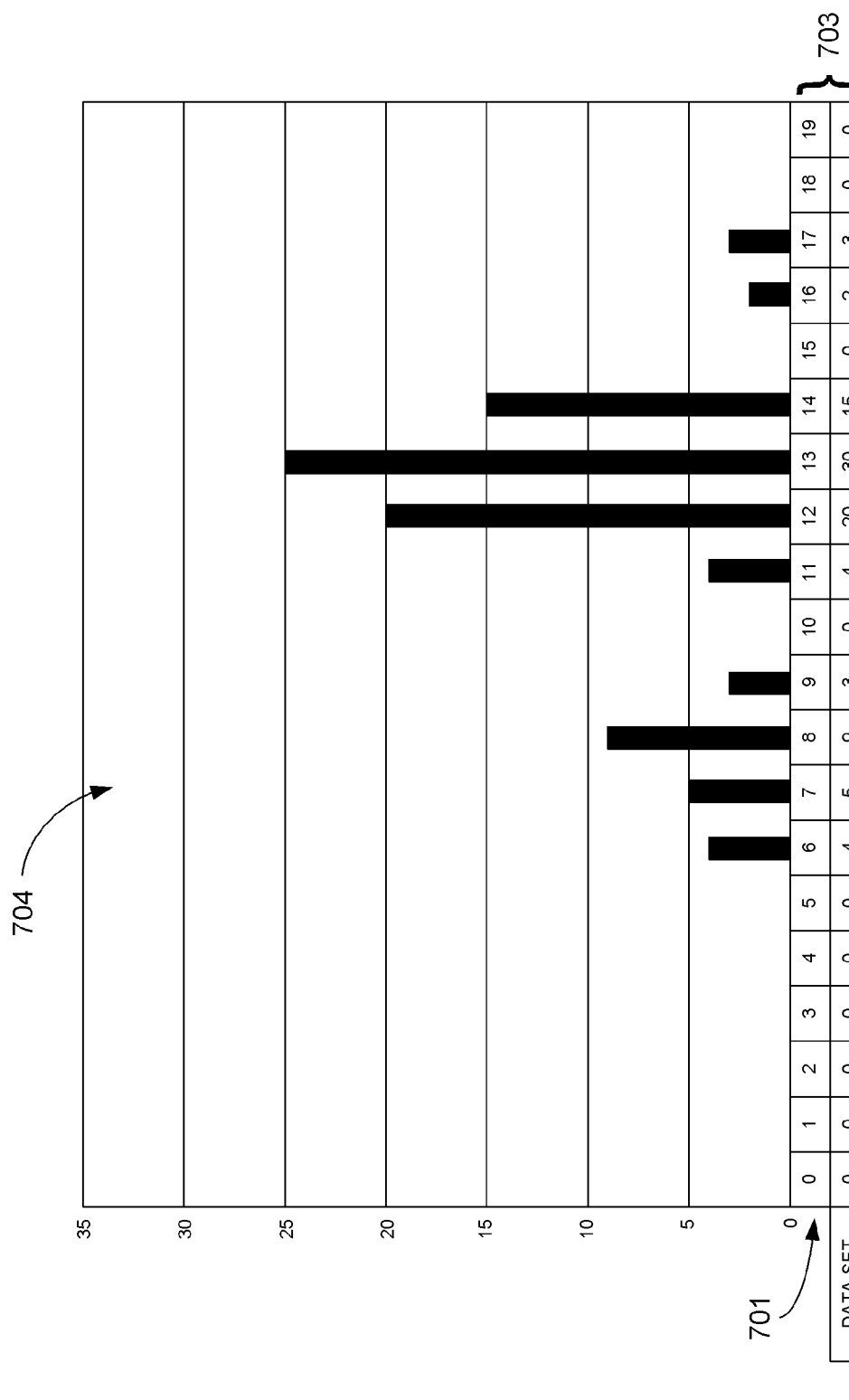
FIG. 7 shows a sample data set and a histogram for the sample data set.
Figure 8:
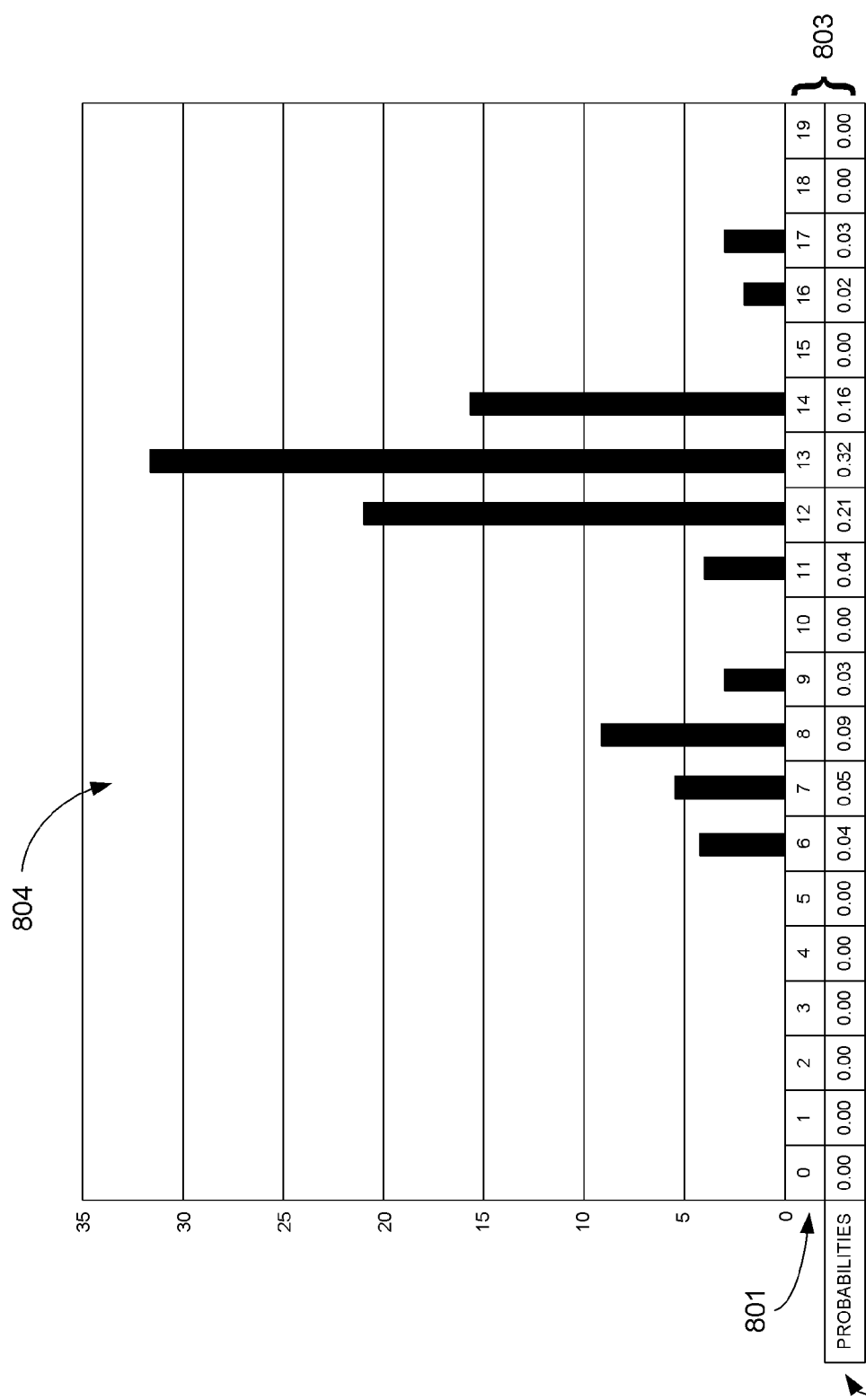
FIG. 8 shows a histogram of the sample data set plotted according to probability values.

FIGS. 7 and 8 show an example of a technique of the invention. FIG. 7 shows a sample data set 702. There are a series of keys or bins 0 to 19, and for each of these bins, there is a value associated with that bin. Specifically, for bins 0 to 5, there are no values. For bin 6, there are 4 values. For bin 7, there are 5 values. For bin 8, there are 9 values. For bin 9, there are 3 values. For bin 10, there are no values. For bin 11, there are 4 values. For bin 12, there are 20 values. For bin 13, there are 30 values. For bin 14, there are 15 values. For bin 15, there are no values. For bin 16, there are 2 values. For bin 17, there are 3 values. For bins 18 and 19, there are no values.

The keying or binning of the data may represent any data distribution. The same data values may be represented using a greater number or fewer number of keys or bins. For example, the bins may be representative of a range of values. So, depending on the size of a range for each bin (e.g., each bin may be equally sized or sized differently), the graph of data distribution will change. If there are more bins, generally the distribution will spread out more, while if there are fewer bins, the distribution will lump together more.

FIG. 7 shows a histogram 703 of a data distribution of sample data set 702. The sample data set has a possible range 701 from 0 to 19. The distribution of this particular data set ranges from 6 to 17. The value 6 is the smallest value of the data set while the value 17 is the largest data value of the data set.

In an implementation, the histogram of this data set is created by counting the number of occurrences or frequency of each data value in the data set. The counting is indifferent to the order of the data values. The counting reveals that this data set contains 95 pieces of data: four counts of data value 6, five 7s, nine 8s, three 9s, four 11s, twenty 12s, thirty 13s, fifteen 14s, two 16s, and three 17s.

For computing purposes, displaying the graphical representation or bar chart of the histogram 704 is not necessary. The graphical representation of the histogram 704 is presented in the figure as a visual aid for understanding the histogram.

FIG. 8 shows the histogram of sample data set 702 created differently from for FIG. 7. Histogram 803 is created by computing the probability of occurrence of each data value 802 within the possible range 801. The probability of occurrence of a data value is computed by dividing the frequency or number of occurrences of that data value to the total number of occurrences of all data values.

The total number of occurrences of all data values in the sample data set is 95, as counted above. The sample data set has four 6s, five 7s, and so forth. The probability that value 6 will occur is 4/95, which is 0.04, rounded to two decimal points. The probability that value 7 will occur is 5/95, which is 0.05, rounded to two decimal points. The probability of occurrences of the other data values 402 are computed the same way (i.e., the number of values for a specific bin divided by the total number of data values) to yield the numbers given in FIG. 8. The probability values will be between 0 and 1, which effectively normalizes the histogram to a domain of 0 to 1. Notice that the graphical histogram 804 of FIG. 8 resembles (or may be identical to depending on the Y scale) histogram 704 in FIG. 7.

As shown in FIGS. 7 and 8, a histogram of a given data set can be created differently. The methods used in FIGS. 7 and 8, by no means, exhaustive. A histogram can be created in using other techniques and may depend on the application and needs.

Referring again to FIG. 7, histogram 703 can be stored in a hash table. The unique data values of the possible range 701 are stored as keys from 0 to 19 in the hash table. The frequencies are stored as the hash values associated with each key. Data values that occur only once will have a frequency or hash value of 1. This situation does not occur in the sample data set. Data values that occur twice will have a frequency or hash value of 2, as in the case for data value 16. The highest frequency of histogram 703 is 30 for the data value 13.

In a specific embodiment of the present invention, the hash table does not contain every key of the possible data range. Instead, the hash table contains only the keys that have associated values. This structure improves the efficiency of the hash table by eliminating the "blank" entries. Table A shows an hash table for efficiently storing the histogram in FIG. 7. Table B shows a hash table storing the probability histogram in FIG. 8.

TABLE A

Histogram in Hash Table

| | Hash Keys (Data Values) | | | | | | | | | |
|---|---|---|---|---|---|---|---|---|---|---|
| | 6 | 7 | 8 | 9 | 11 | 12 | 13 | 14 | 16 | 17 |
| Hash Values (Frequencies) | 4 | 5 | 9 | 3 | 4 | 20 | 30 | 15 | 2 | 3 |

TABLE B

Probability Histogram in Hash Table

| | Hash Keys (Data Values) | | | | | | | | | |
|---|---|---|---|---|---|---|---|---|---|---|
| | 6 | 7 | 8 | 9 | 11 | 12 | 13 | 14 | 16 | 17 |
| Hash Values (Probabilities) | 0.04 | 0.05 | 0.09 | 0.03 | 0.04 | 0.21 | 0.32 | 0.16 | 0.02 | 0.03 |

Accumulated Histogram and Normalized Accumulated Histogram. Once a histogram of a data set is created, it is beneficial to create an accumulated histogram (AH) or a normalized version of the accumulated histogram. An accumulated histogram is a histogram where the frequency of each data value is the accumulation of the frequency of the current data value plus the frequencies of all the previous data values. Using the histogram in table A, for example, the accumulated frequency of the third data value 8 is 18 (i.e., 4 for the data value 6 plus 5 for the data value 7 plus 9 for the data value 8). Table 4 shows the accumulated histogram of the sample data set stored in a hash table.

TABLE C

Accumulated Histogram in Hash Table

| | Hash Keys (Data Values) | | | | | | | | | |
|---|---|---|---|---|---|---|---|---|---|---|
| | 6 | 7 | 8 | 9 | 11 | 12 | 13 | 14 | 16 | 17 |
| Hash Values (Accumulated Frequencies) | 4 | 9 | 18 | 21 | 25 | 45 | 75 | 90 | 92 | 95 |

An accumulated histogram can be normalized to the domain of 0 to 1. Because of this unique domain, a normalized accumulated histogram is often preferred over a nonnormalized accumulated histogram. With the unique domain, a normalized accumulated histogram is readily mapped to another domain. The further mapping will be discussed in detail below. In some embodiments of the present invention, the nonnormalized accumulated histogram may be used.

Table D shows the normalized accumulated histogram of the sample data set. The normalized accumulated histogram can be computed in different ways. One computation is to apply the above accumulation method to the probabilities in table B. For example, the normalized accumulated frequency of the third data value 8 is 0.19 (i.e., 0.04+0.05+0.09).

Another method is to divide each of the accumulated frequencies in table C by 95, the total number of occurrences of all data values in the sample data set. For example, the normalized accumulated frequency of the third data value 8 is 18/95, which is 0.19, rounded to two decimal points. Both methods yield the same results as shown in table D. Other mathematically equivalent methods would yield similar results.

ping the normalized accumulated histogram to a domain is applying this mapping equation:

mapped value=normalized accumulated frequency* (max−min)+min

As with any mathematical equations, there are many variations of this mapping equation. Furthermore, other mapping equations or methods may also be used in the embodiments of the present invention.

Table E shows an embodiment in which the normalized accumulated histogram of table D is mapped back to a portion of the original domain, between 6 and 17. The chosen portion eliminates the beginning (0 to 5) and the end (18 to 19) of the original range (0 to 19) where there is zero frequencies, as shown in FIG. 3. To map to the range between 6 and 17, assign the min value and the max value of the mapping equation to 6 and 17, respectively. For example, the mapped value of the normalized accumulated frequency 0.22 of data value 9 equals to 0.22*(17−6)+6, which is 8.43, rounded to two decimal points. The mapping values of the data set are shown in the third row of table E.

TABLE D

Normalized Accumulated Histogram in Hash Table

| | Hash Keys (Data Values) | | | | | | | | |
|---|---|---|---|---|---|---|---|---|---|
| | 6 | 7 | 8 | 9 | 11 | 12 | 13 | 14 | 16 | 17 |
| Hash Values (Normalized Accumulated Frequencies) | 0.04 | 0.09 | 0.19 | 0.22 | 0.26 | 0.47 | 0.79 | 0.95 | 0.97 | 1.00 |

In some programming languages (e.g., Java), creating an efficient hash table and finding the first and last keys are easy with certain predefined objects. An example is Java's predefined TreeMap object. Assume the hash table is named dataHashTable of the TreeMap object, creating a hash table

TABLE E

Normalized Accumulated Histogram and Mapped Values

| | Data Values (Hash Keys) | | | | | | | | | |
|---|---|---|---|---|---|---|---|---|---|---|
| | 6 | 7 | 8 | 9 | 11 | 12 | 13 | 14 | 16 | 17 |
| Normalized Accumulated Frequencies | 0.04 | 0.09 | 0.19 | 0.22 | 0.26 | 0.47 | 0.79 | 0.95 | 0.97 | 1.00 |
| Mapped Values | 6.46 | 7.04 | 8.08 | 8.43 | 8.89 | 11.21 | 14.68 | 16.42 | 16.65 | 17.00 | entry is simply assigning a value to a key, i.e., dataHashTable.put (key, value). The first and last keys are conveniently stored, at all times, in the dataHashTable.firstKey object and the dataHashTable.lastKey object, respectively. Similarly, the hash table can be implemented using a red-black tree data structure in any suitable programming language. A red-black tree keeps the data values in ascending order. In a specific embodiment of the present invention, the Java TreeMap object is used. Other embodiments are implemented with the red-black tree data structure.

Mapping to a Range. A normalized accumulated histogram can be mapped back to any domain including a portion of the original domain of the data set. One exemplary way of map- In a specific embodiment of the present invention, implemented with a Java TreeMap object, the min and max values are stored in the TreeMap object's firstkey and lastkey, respectively.

A user interface of the invention may have a dial or slider bar user interface. In some embodiments of the present invention, histogram equalization is applied to a dial or a slider bar user interface. A dial and a slider bar are typically used to select a single data value from a given data set. However, if the data set is not distributed uniformly, the dial or slider bar may feel insensitive, i.e., not picking up any value when dialing or sliding through the regions where there are no data values. Applying histogram equalization to the data set tends to minimize the void regions of the dial or slider bar, thus improving the effectiveness and sensitivity of the user interfaces.

The following description is for a slider bar, but the description is applicable to a dial user interface. Each data value may occupy more than one slider position. The number of slider positions a data value may occupy are roughly proportional to the frequency of the data value.

Applying histogram equalization allows an assignment of data values to slider positions. For explanation of the assignment, the sample data set is used. The normalized accumulated histogram of this data set, shown in table D, is mapped to the length of the slider bar. A typical slider bar has a range of 1 to 100; though, any arbitrary range will work. Using this range, the min and max values for the mapping equation are 1 and 100, respectively. The resulting mapped values are shown in the second row of table F.

TABLE F

Mapped Values in Hash Table

| Hash Keys (Data Values) | | | | | | | | | |
|---|---|---|---|---|---|---|---|---|---|
| | 6 | 7 | 8 | 9 | 11 | 12 | 13 | 14 | 16 | 17 |
| Mapped Values | 5 | 10 | 20 | 23 | 27 | 48 | 79 | 95 | 97 | 100 |

The mapped values are used to assign data values to the slider positions. There are many ways to achieve this assignment. An efficient assignment is to use a hash table to store the data values and mapped values, as in table F. This can be a separate hash table or the hash table in table D having the normalized accumulated frequencies replaced by the mapped values. One added benefit of using a hash table is that the table does not contain duplicate entries of the data values. The duplication of each data value has been summed up as frequency, normalized, and then converted to the mapped value.

In one embodiment, the slider bar is represented by an array, as in table G. The indexes of the array are the slider positions. When the slider slides through the range of the bar, represented by the length of the array, the slider picks up or selects the values stored in the positions represented by the indexes. The way to assign values to this array is by reverse transformation.

To compute the reverse transformation mapping, a single iteration is made through the keys of the hash table in table F. The keys are iterated from the smallest key (6) to the largest key (17). At each step, there is a current hash key and a current hash value. For example, in the first step, the current hash key is 6 and the current hash value is 5. The current hash key and current hash value, in the last iteration, are 17 and 100, respectively.

At each step through the hash table, step through the array of table G, from the smallest index to the largest index, to assign values to the array cells as follows: for each cell that (a) has an index less than the current hash value and (b) has not been assigned a value, assign to that cell a value equal to the current hash key. After the last step through the hash table, fill the remaining of the array cells with the last assigned value. The results are shown in table G.

An array constructed this way can be used directly by a slider bar user interface to select a data value in each position. For example, when the slider is at position 24, the data value selected is "11."

TABLE G

Slider Bar Array

| | Indexes/Slider Positions | | | | | | | | |
|---|---|---|---|---|---|---|---|---|---|
| | 1 to 4 | 5 to 9 | 10 to 19 | 20 to 22 | 23 to 26 | 27 to 47 | 48 to 78 | 79 to 94 | 95 to 96 | 97 to 100 |
| Data Values (Hash Keys) | 6 | 7 | 8 | 9 | 11 | 12 | 13 | 14 | 16 | 17 |

In a specific embodiment, the Java programming language is used to implement the data transformations in a reusable Java class. The Java class stores the data set in a way that has several desirable benefits, making this particular implementation elegant and efficient in both memory access and CPU time. The class can be used, for example, with a standard Java Swing slider bar, the JSlider. Each time a user adjusts the slider, the class needs only perform a single array reference to determine a data value. The class also functions as an ordered hash table, making it trivial to identify duplicate data values and calculate their frequencies as the data is loaded.

In some embodiments of the present invention, the user interface consists of two or more slider bars or dials selecting data values from one set of histogram equalized data. For example, with two slider bars, one slider bar may be used to select a data value from the lower range of the data domain, while another slider bar selects a data value from the higher range of the domain. If a third slider bar is deployed, it may be used to select a data value from the mid-domain. In other embodiments, the slider bars may be selecting data values from different sets of data. In still other embodiments, a double-thumbed slider bar may be used to select a range of data values from a data set by using one thumb to specify a minimum value for the range and the other thumb to specify a maximum value for the range.

The interface of the invention may display information using grayscale. In some embodiments of the present invention, histogram equalization is used to display data values in a range of gray levels. The advantage of applying histogram equalization is that the most frequently occurred data values are distributed more uniformly on the grayscale than the least frequently occurred data values. The range of grays can be predefined or created in any fashion.

A typical predefined grayscale, represented by one byte or eight bits of information, has a range of 0 (black) to 255 (white). The levels of gray increase, i.e., darken, from white to black as the eight-bit value decreases from 255 to 0. For example, the data set may be desired to display in a range of grays between 50 and 200, leaving out the whitest grays (201-255) and the darkest grays (0-49).

For example, to display the sample data set in gray levels, the normalized accumulated histogram of the data set is computed, as shown in table D above. The normalized accumulated histogram will map to the gray levels using the above mapping equation with the min and max values of 50 and 200, respectively. Table H shows the data values and the mapped gray values.

TABLE H

Normalized Accumulated Histogram and Gray Levels

| | Data Values (Hash Keys) | | | | | | | | | |
|---|---|---|---|---|---|---|---|---|---|---|
| | 6 | 7 | 8 | 9 | 11 | 12 | 13 | 14 | 16 | 17 |
| Normalized Accumulated Frequencies | 0.04 | 0.09 | 0.19 | 0.22 | 0.26 | 0.47 | 0.79 | 0.95 | 0.97 | 1.00 |
| Mapped Gray Levels | 56 | 64 | 78 | 83 | 89 | 121 | 168 | 192 | 195 | 200 |

In a specific embodiment, the invention shows a scatter plot or similar graphical representation (or diagram) of the data transformed through histogram equalization to make overlapping points easier to visualize and appreciate. Each point in the diagram will be represented using a black dot (or other color) or absence of a dot. In an alternative embodiment, each point will be represented in grayscale (as described above) or in color as desired; this embodiment will show one or more additional dimensions of the data. An X position and Y position of each point in the scatter plot will be based on the keys and mapped values. Applying histogram equalization to the data will tend to spread out the highest frequency values so this data will be more easily discernable.

The interface of the invention may use a pie chart display. The data set is now ready to be displayed in grayscale using graphs, bar charts, pie charts, or any suitable graphical representations. In one embodiment, the sample data set is displayed in a grayscale pie chart. The data values are shown as keys in table H.

Since there are ten data values in this data set, the pie chart will have ten slices. The size of each slice is proportional to the frequency of each data value, as shown in table A. The slices are to be displayed using the gray levels in the last row of table H. For example, for data value 6, the slice representing it will have the size, in angle, of 15 degree (a frequency of 4 divided by a total of 95, and then multiply by 360 degrees). This slice will be displayed in the gray level 56. Similarly, for data value 13 with the highest frequency of 30, the slice representing it will have an angle of 114 degree (30/95*360, rounded to an integer). The gray value for this big slice is 168.

The interface of the invention may use a bar chart display. In another embodiment, a data set is represented by a bar chart. The frequencies are the lengths of the bars, displaying on any scale. Referring to the sample data set, for example, if the bar chart has a desire scale of 5, the data value 6 will have a bar of 20 units in length (frequency of 4 multiply by the scale of 5). Table H shows that the gray level for this data value is 56. Similarly, for data value 13, the bar length will be 150 units (30*5), and the gray value for this bar is 121.

The interface of the invention may be displayed using colors or a color scheme. In some embodiments of the present invention, the advantage of applying histogram equalization is realized in displaying data values in colors. In a typical displaying device, colors are stored in a color map or color palette. Each entry of the palette holds a color. The indexes to the palette serve as a look-up table for colors assigned to the palette. A color palette may have any number of entries, but 256 entries are typical. A displaying device may establish other specialized color palettes, for example, a web-safe or other color palette. A color palette can also be defined in any arbitrary fashion with any combination of colors.

In one embodiment, the color palette has 256 entries, ranging from 0 to 255. Colors can be represented in different ways. Two of the typical representations are the hue-saturation-value (HSV) and red-green-blue (RGB) systems. Table D shows an RGB color system. In an RGB representation, each of the three primary colors-red, green, and blue-are represented by a value. The combination of these primary colors makes up the actual color. A typical RGB system uses one byte (i.e., eight bits) to represent each of the red, green, and blue. One byte holds a maximum decimal value of 255 or a maximum hexadecimal value of FF.

To display the sample data set, for example, in colors, the normalized accumulated histogram of the data set is computed, as shown in table D above. The desired color palette and the range of indexes to this palette are chosen. The range can be the entire palette or a portion of it. In one embodiment, a portion of a color palette may be used. In this embodiment, the data values are to be displayed in colors between entry 50 and entry 200 of a palette with at least 200 entries. The normalized accumulated histogram is then mapped to this range of indexes to the color palette using the above mapping equation. The min and max values of the mapping equation are 50 and 200, respectively.

Table I shows the data values, the normalized accumulated frequencies, the indexes to the color palette the frequencies are mapped to, and the RGB color values in hexadecimal that can be looked up with the mapped indexes. The displaying device uses the information in table I to display the data values in colors graphs, bar charts, pie charts, or any suitable graphical representations. Creating color displays follows the methods discussed above for displaying in gray values with the additional step of using the mapped values as indexes to look up the colors in a color palette. The indexes efficiently map data values to indexes to a color palette. For example, in a color pie chart, the slice representing the data value "6" is displayed in the RGB color of ffffff. The color ffffff is looked up with the mapped value 56 as an index to the color palette.

TABLE I

Normalized Accumulated Histogram and Indexes to Colors

| | Data Values (Hash Keys) | | | | |
|---|---|---|---|---|---|
| | 6 | 7 | 8 | 9 | 11 |
| Normalized Accumulated Frequencies | 0.04 | 0.09 | 0.19 | 0.22 | 0.26 |
| Indexes to Color Palette | 56 | 64 | 78 | 83 | 89 |
| Colors in Hexadecimal | ffffff | fdfle7 | fbf5d0 | e8fab9 | bcf8a2 |

| | Data Values (Hash Keys) | | | | |
|---|---|---|---|---|---|
| | 12 | 13 | 14 | 16 | 17 |
| Normalized Accumulated Frequencies | 0.47 | 0.79 | 0.95 | 0.97 | 1.00 |
| Indexes to Color Palette | 121 | 168 | 192 | 195 | 200 |

TABLE I-continued

Normalized Accumulated Histogram and Indexes to Colors

| Colors in Hexadecimal | 8bf698 | 75f4ba | 5ff3ee | 49affl | 3456ef |
|---|---|---|---|---|---|

In some embodiments of the present invention, the dial or slider bar user interface is selecting a gray level or a color instead of a data value. In these embodiments, the array that represents the slider bar, as shown in table G, is assigned the gray levels or colors in the reverse transformation process discussed above. To assign gray levels to the array, replacing the step that assign the current hash key to a cell of the array with a step that uses the current hash key to look up a gray level in a color palette and assign that gray level to the array cell. To assign colors to the array, the current hash key is used to look up a color in table I for assignment to a cell of the array.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
    creating a first histogram of data values of a data set, wherein the first histogram comprises keys and first histogram values for the keys, with unique values among the data values being stored as the keys and frequencies of the unique values being stored as the first histogram values;
    creating a second histogram of the data values comprising generating second histogram values for each key of the first histogram, wherein the second histogram values comprise cumulative frequency values based on the first histogram values;
    creating a mapping for at least a portion of the data set, based on the second histogram values;
    generating, by use of at least one processor, a visualization for at least the portion of the data set, the generating comprising selecting an attribute of an object in the visualization representing a data value of the data set based on the mapping;
    mapping an interactive control, to the data values by reverse transformation based on an array, of indexes corresponding to positions of the interactive control, and of data values corresponding to said unique values in the data set, wherein each data value in the array corresponds to a range of indexes in the array; and
    using the array to select one of the unique values corresponding to a position of the interactive control, for use in changing, in a memory coupled to the processor, the portion of the data set used in said generating of the visualization~ in response to an adjustment to the interactive control.

2. The method of claim 1 wherein the attribute comprises:
    at least one of an area of the object, a size of the object, a length of the object, a width of the object, a height of the object, a position of the object, an X position of the object, a Y position of the object, an angle of the object, or a distance of the object.

3. The method of claim 1 wherein the generating further comprises:
    generating a large rectangle divided into a plurality of small rectangles comprising at least one small rectangle for each key of the first histogram.

4. The method of claim 3 wherein an aggregation value is used in computing an area of each small rectangle and the aggregation value is at least one of a sum, average, maximum, minimum, median, or count.

5. The method of claim 3 further comprising:
    showing an informational window for a small rectangle in said plurality when a cursor is moved over the small rectangle.

6. The method of claim 3 wherein the large rectangle is a square.

7. The method of claim 1 wherein the interactive control comprises at least one of: a slider bar or a dial.

8. The method of claim 1 further comprising:
    performing histogram equalization on the second histogram values, during said creation of said mapping for said portion of the data set.

9. The method of claim 1 wherein:
    each of a minimum value and a maximum value, of data values in the portion, are specified by at least the interface control.

10. A method comprising:
    creating a first histogram of data values of a data set, wherein the first histogram comprises keys and first histogram values for the keys, with unique values among the data values being stored as the keys and frequencies of the unique values being stored as the first histogram values;
    creating a second histogram of the data values comprising generating second histogram values for each key of the first histogram, wherein the second histogram values comprise cumulative frequency values based on the first histogram values;
creating a color mapping for at least a portion of the data set, based on the second histogram values;
    generating, by use of at least one processor, a visualization for the data set, the generating comprising selecting a color for a data value of the data set based at least on the color mapping;
    mapping of an interactive control, to the data values based on an array, of indexes corresponding to positions of the interactive control, and of data values corresponding to said unique values in the data set, wherein each data value in the array corresponds to a range of indexes in the array; and
    using the array to select one of the unique values corresponding to a position of the interactive control, for use in changing, in a memory coupled to the processor, the portion of the data set used in said generating of the visualization~ in response to an adjustment to the interactive control.

11. The method of claim 10 wherein the color mapping is a gray value mapping.

12. The method of claim 10 wherein the generating further comprises:
    selecting an attribute for an object representing the data value in the visualization based on the data value's second histogram value.

13. A method comprising:
    creating a first histogram of data values of a data set, wherein the first histogram comprises keys and first histogram values for the keys;

creating a second histogram of the data values comprising generating second histogram values for each key of the first histogram, wherein the second histogram values comprise cumulative frequency values based on the first histogram values;

creating a mapping for the data set based on the second histogram values;

providing, by use of at least one processor, a user interface for a visualization for at least a portion of the data set, the user interface comprising an interactive control to alter the visualization;

mapping the interactive control, to the data values based on an array, of indexes corresponding to positions of the interactive control, and of data values corresponding to said unique values in the data set, wherein each data value in the array corresponds to a range of indexes in the array; and using the array to select one of the unique values corresponding to a position of the interactive control, for use in changing, in a memory coupled to the processor, the portion of the data set used in said generating of the visualization in response to an adjustment to the interactive control.

14. The method of claim 13 wherein the interactive control comprises:
at least one of a slider bar, a joystick, a dial, a control mechanism to indicate a position along a path, a control mechanism to indicate a position within a two-dimensional range, a control to indicate a position within a range, a control that indicates a pressure within a range of pressures, or a control that indicates a velocity within a range of velocities.

15. The method of claim 13 wherein the interactive control is implemented in software and displayed in the user interface.

16. The method of claim 15 wherein the interactive control is accessible through a pointer input device.

17. The method of claim 13 comprising:
changing the visualization, in response to the adjustment to the interactive control;
wherein the interactive control specifies at least one of a minimum key value or a maximum key value, for data values in the visualization; and
wherein another interactive control in said user interface specifies another of said minimum key value or said maximum key value.

18. The method of claim 13 wherein the visualization does not show data values of zero.

19. A user interface comprising:
a monitor;
a memory comprising a first histogram of data values of a data set, wherein the first histogram comprises keys and first histogram values for the keys;
the memory comprising a second histogram of the data values, the second histogram comprising second histogram values generated for each key of the first histogram, wherein the second histogram values comprise cumulative frequency values based on the first histogram values;
a visualization window on said monitor, to graphically display at least a portion of a data set, wherein an attribute, of an object in the visualization window, representing a data value of the data set is based on any histogram for the data set; and
an interactive control to adjust a view in the visualization window, the interactive control being mapped to unique data values in the data set based on an array, of indexes corresponding to positions of the interactive control, and of data values corresponding to said unique values in the data set, wherein each data value in the array corresponds to a range of indexes in the array, wherein adjustments made through the interactive control use the array to select one of the unique values to change the histogram of the portion of the data set.

20. The user interface of claim 19 wherein the attribute for an object comprises:
at least one of an area of the object, a size of the object, a length of the object, a width of the object, a height of the object, a position of the object, an X position of the object, a Y position of the object, an angle of the object, or a distance of the object.

21. The user interface of claim 19 wherein the graphical display of the data set comprises a large polygon divided into a plurality of small polygons, wherein the attribute of an object representing a data value is color.

22. The user interface of claim 19 wherein the interactive control comprises:
at least one of a slider bar, a joystick, a dial, a control mechanism to indicate a position along a path, a control mechanism to indicate a position within a two-dimensional range, a control to indicate a position within a range, a control that indicates a pressure within a range of pressures, or a control that indicates a velocity within a range of velocities.

23. The user interface of claim 19 wherein the interactive control adjusts at least one of a maximum area for a small polygon shown in the visualization window, a minimum area for a small polygon shown in the visualization window, a minimum color value for a small polygon shown in the visualization window, or a maximum color value for a small polygon shown in the visualization window.

24. A method comprising:
creating a first histogram of data values of a data set, wherein the first histogram comprises keys and first histogram values for the keys;
creating a second histogram of the data values comprising generating second histogram values for each key of the first histogram, wherein the second histogram values comprise cumulative frequency values based on the first histogram values;
creating, by use of at least one processor, a mapping for at least a portion of the data set based on the second histogram values;
providing a user interface for the data set comprising an interactive control to alter a physical characteristic based on the mapping, the interactive control being mapped to unique data values in the data set based on an array, of indexes corresponding to positions of the interactive control, and of data values corresponding to said unique values in the data set, wherein each data value in the array corresponds to a range of indexes in the array; and
changing, in a memory coupled to the processor, the portion of the data set, for use in creating the mapping, in response to an adjustment to the interactive control;
wherein adjustments made through the interactive control use the array to select one of the unique values.

25. The method of claim 24 wherein the interactive control comprises:
at least one of a slider bar, a joystick, a dial, a control mechanism to indicate a position along a path, a control mechanism to indicate a position within a two-dimensional range, a control to indicate a position within a range, a control that indicates a pressure within a range of pressures, or a control that indicates a velocity within a range of velocities.

26. The method of claim 24 wherein the physical characteristic comprises:
    at least one of sound, sound frequency, sound volume, light, light intensity, color, position, pressure, fluid volume, temperature, electromagnetic radiation, current, voltage, resistance, impedance, inductance, capacitance, or height.

27. A non-transitory computer-readable medium comprising instructions that when executed in a computer cause the computer to:
    create a first histogram of data values of a data set, wherein the first histogram comprises keys and first histogram values for the keys;
    create a second histogram of the data values comprising generating second histogram values for each key of the first histogram, wherein the second histogram values comprise cumulative frequency values based on the first histogram values;
    create a mapping for at least a portion of the data set, based on the second histogram values;
    generate, by use of at least one processor in the computer, a visualization for at least a portion of the data set, based on the mapping;
    map of an interactive control, based on the second histogram values, the interactive control being mapped to unique data values in the data set based on an array, of indexes corresponding to positions of the interactive control, and of data values corresponding to said unique values in the data set, wherein each data value in the array corresponds to a range of indexes in the array; and
    change in a memory coupled to the processor, the portion of the data set, for use in generating the visualization in response to an adjustment to the interactive control;
    wherein adjustments made through the interactive control use the array to select one of the unique values.

28. The non-transitory computer-readable medium of claim 27 further comprising instructions that when executed in the computer cause the computer to:
    perform histogram equalization on the second histogram values, during creation of said mapping for said portion of the data set.

29. The non-transitory computer-readable medium of claim 27 wherein:
    the interactive control specifies at least one of a minimum key value and a maximum key value, for data values in the visualization; and
    another interactive control in said user interface specifies another of said minimum key value or said maximum key value.

30. The non-transitory computer-readable medium of claim 27 wherein:
    the interactive control specifies a filter for data values in the visualization.

31. A non-transitory computer-readable medium comprising instructions that when executed in a computer cause the computer to:
    create a first histogram of data values of a data set, wherein the first histogram comprises keys and first histogram values for the keys;
    create a second histogram of the data values, the second histogram comprising second histogram values generated for each key of the first histogram, wherein the second histogram values comprise cumulative frequency values based on the first histogram values;
    generate a visualization window on a monitor, to graphically display at least a portion of a data set, wherein an attribute, of an object in the visualization window, representing a data value of the data set is based on any histogram for the data set; and
    map an interactive control to adjust a view in the visualization window, the interactive control being mapped to unique data values in the data set based on an array, of indexes corresponding to positions of the interactive control, and of data values corresponding to said unique values in the data set, wherein each data value in the array corresponds to a range of indexes in the array, wherein adjustments made through the interactive control use the array to select one of the unique values to change the histogram of the portion of the data set.

32. The non-transitory computer-readable medium of claim 31 wherein the interactive control adjusts at least one of a maximum area for a small polygon shown in the visualization window, a minimum area for a small polygon shown in the visualization window, a minimum color value for a small polygon shown in the visualization window, or a maximum color value for a small polygon shown in the visualization window.

33. A method comprising:
    creating a first histogram of data values of a data set, wherein the first histogram comprises keys and first histogram values for the keys;
    creating a second histogram of the data values, the second histogram comprising second histogram values generated for each key of the first histogram, wherein the second histogram values comprise cumulative frequency values based on the first histogram values;
    generating, by use of at least one processor, a visualization window on a monitor, to graphically display at least a portion of a data set, wherein an attribute, of an object in the visualization window, representing a data value of the data set is based on any histogram for the data set; and
    mapping an interactive control to adjust a view in the visualization window, the interactive control being mapped to unique data values in the data set based on an array, of indexes corresponding to positions of the interactive control, and of data values corresponding to said unique values in the data set, wherein each data value in the array corresponds to a range of indexes in the array, wherein adjustments made through the interactive control use the array to select one of the unique values to change the histogram of the portion of the data set.

34. The method of claim 33 wherein the interactive control adjusts at least one of a maximum area for a small polygon shown in the visualization window, a minimum area for a small polygon shown in the visualization window, a minimum color value for a small polygon shown in the visualization window, or a maximum color value for a small polygon shown in the visualization window.

35. The non-transitory computer-readable medium of claim 33 further comprising instructions to cause the computer to:
    perform histogram equalization on the second histogram values, during creation of said mapping for said portion of the data set;
    an interactive control to adjust a view in the visualization window, the interactive control being mapped to unique data values in the data set based on an array, of indexes corresponding to positions of the interactive control, and of data values corresponding to said unique values in the data set, wherein each data value in the array corresponds to a range of indexes in the array, wherein adjustments made through the interactive control use the array to select one of the unique values to change the histogram of the portion of the data set.

36. A non-transitory computer-readable medium comprising instructions that when executed in a computer cause the computer to:
- create a first histogram of data values of a data set, wherein the first histogram comprises keys and first histogram values for the keys;
- create a second histogram of the data values comprising generating second histogram values for each key of the first histogram, wherein the second histogram values comprise cumulative frequency values based on the first histogram values;
- create, by use of at least one processor, a mapping for at least a portion of the data set based on the second histogram values;
- provide a user interface for the data set comprising an interactive control to alter a physical characteristic based on the mapping, the interactive control being mapped to unique data values in the data set based on an array, of indexes corresponding to positions of the interactive control, and of data values corresponding to said unique values in the data set, wherein each data value in the array corresponds to a range of indexes in the array; and
- change, in a memory coupled to the processor, the portion of the data set, for use in creating the mapping, in response to an adjustment to the interactive control;
- wherein adjustments made through the interactive control use the array to select one of the unique values.

* * * * *

UNITED STATES PATENT AND TRADEMARK OFFICE
CERTIFICATE OF CORRECTION

PATENT NO.         : 8,806,321 B2                                              Page 1 of 1
APPLICATION NO.    : 11/768686
DATED              : August 12, 2014
INVENTOR(S)        : Helfman It is certified that error appears in the above-identified patent and that said Letters Patent is hereby corrected as shown below:

In the Specification

In column 3, line 46, delete "interface" and insert -- interface. --, therefor.

In column 3, line 60, after "on" delete "the".

In column 6, lines 26-37, delete "A computer-implemented.........RAM." and insert the same on column 6, line 27 as a new paragraph.

In column 8, line 56, delete "discemable." and insert -- discernable. --, therefor.

In the Claims

In column 21, line 50, in Claim 1, delete "control," and insert -- control --, therefor.

In column 21, line 60, in Claim 1, delete "visualization~" and insert -- visualization, --, therefor.

In column 22, line 45, in Claim 10, after "mapping" delete "of".

In column 22, line 45, in Claim 10, delete "control," and insert -- control --, therefor.

In column 22, line 55, in Claim 10, delete "visualization~" and insert -- visualization, --, therefor.

In column 25, line 27, in Claim 27, after "map" delete "of".

In column 26, line 56, in Claim 35, delete "non-transitory computer-readable medium" and insert -- method --, therefor.

Signed and Sealed this
Tenth Day of March, 2015

Michelle K. Lee
*Deputy Director of the United States Patent and Trademark Office*